United States Patent
Yokoyama

(10) Patent No.: US 9,261,348 B2
(45) Date of Patent: Feb. 16, 2016

(54) ROTARY INPUT APPARATUS

(71) Applicant: ALPS ELECTRIC CO., LTD., Ota-ku, Tokyo (JP)

(72) Inventor: Tatsuya Yokoyama, Tokyo (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 28 days.

(21) Appl. No.: 13/911,196

(22) Filed: Jun. 6, 2013

(65) Prior Publication Data

US 2013/0342222 A1 Dec. 26, 2013

(30) Foreign Application Priority Data

Jun. 20, 2012 (JP) ................................. 2012-138374

(51) Int. Cl.
*G01R 27/26* (2006.01)
*G01B 7/14* (2006.01)
*G01D 5/241* (2006.01)

(52) U.S. Cl.
CPC ................ *G01B 7/14* (2013.01); *G01D 5/2415* (2013.01)

(58) Field of Classification Search
CPC ............ G01B 7/14; G08C 19/10; G01D 5/24; G01D 5/2412; G01D 5/241
USPC .......... 324/662, 207.25, 207.11–207.26, 658, 324/659, 660, 661, 68; 33/783, 784, 792, 33/501–501.19, 1 PT, 1 N, 793, 794
See application file for complete search history.

(56) References Cited

U.S. PATENT DOCUMENTS

| | | | | |
|---|---|---|---|---|
| 3,198,937 | A | * | 8/1965 | Wooster ............................ 341/9 |
| 4,158,216 | A | * | 6/1979 | Bigelow ........................ 200/600 |
| 4,843,387 | A | * | 6/1989 | Arai et al. ................ 340/870.37 |
| 5,910,781 | A | | 6/1999 | Kawamoto et al. |
| 2006/0158041 | A1 | * | 7/2006 | Caldwell et al. .............. 307/116 |
| 2007/0018658 | A1 | * | 1/2007 | Hayashida et al. ........... 324/650 |
| 2013/0187639 | A1 | * | 7/2013 | Sasaki ...................... 324/207.17 |

FOREIGN PATENT DOCUMENTS

JP 10-232104 2/1998

* cited by examiner

*Primary Examiner* — Arleen M Vazquez
*Assistant Examiner* — Steven Yeninas
(74) *Attorney, Agent, or Firm* — Hunton & Williams LLP

(57) ABSTRACT

In a rotary input apparatus, a stationary ground electrode, a first stationary sensing electrode, and a second stationary sensing electrode are formed on a stationary facing surface of a stationary plate. The first stationary sensing electrode includes first facing portions and a first connecting portion electrically connecting the first facing portions, and the second stationary sensing electrode includes second facing portions and a second connecting portion electrically connecting the second facing portions. Each of the first facing portions has a different phase from that of the corresponding one of the second facing portions in a rotation direction. When a rotary electrode, which is provided on a rotary portion, rotates, an encoded signal of a first phase is obtained between the first stationary sensing electrode and the ground potential, and an encoded signal of a second phase is obtained between the second stationary sensing electrode and the ground potential.

3 Claims, 7 Drawing Sheets

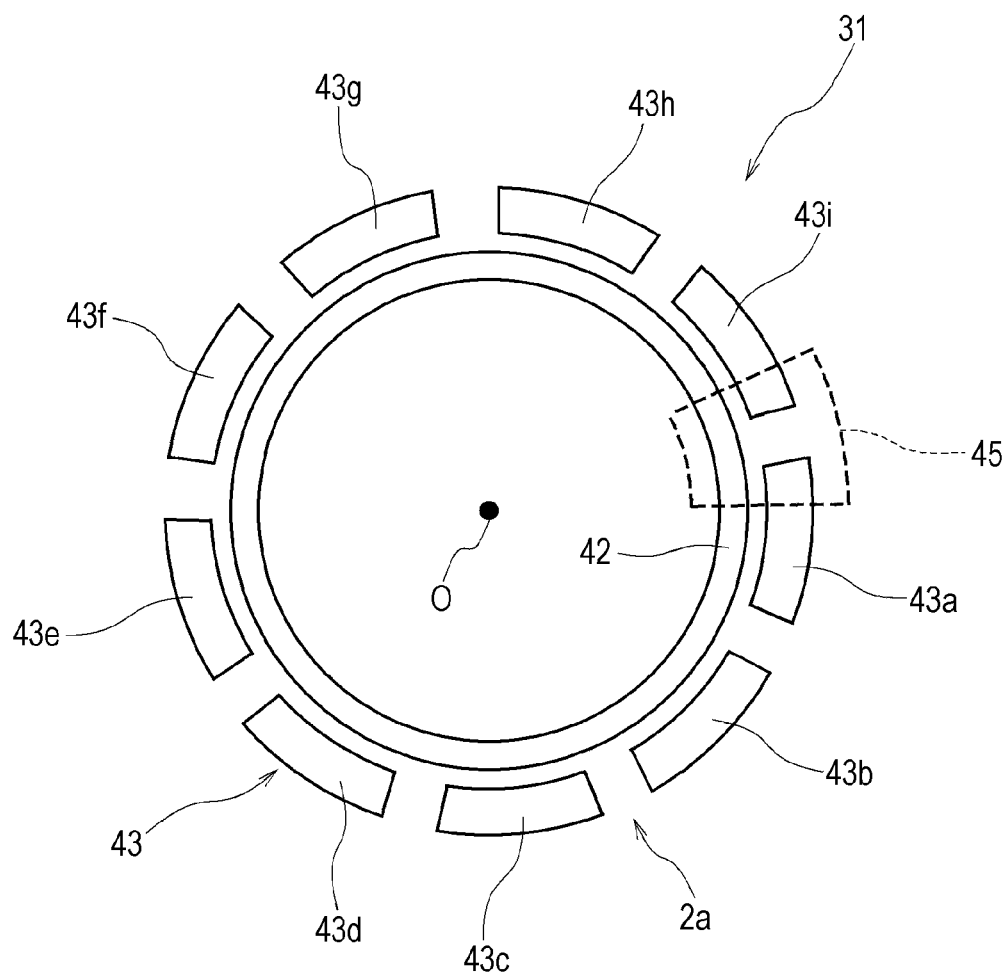

ROTARY INPUT APPARATUS

CLAIM OF PRIORITY

This application claims benefit of and contains subject matter related to Japanese Patent Application No. 2012-138374 filed on Jun. 20, 2012, the entire contents of which is incorporated herein by reference.

BACKGROUND OF THE DISCLOSURE

1. Field of the Disclosure

The present disclosure relates to a rotary input apparatus capable of obtaining input signals that correspond to a rotary operation in a contactless manner.

2. Description of the Related Art

Japanese Unexamined Patent Application Publication No. 10-232104 discloses a capacitive angle detector. In this capacitive angle detector, electrodes on a first member and electrodes on a second member face each other, thereby forming capacitors. A third member that is a dielectric or a metallic conductor is interposed between the first member and the second member, and capacitances of the capacitors formed between the electrodes on the first member and the electrodes on the second member vary with rotation of the third member.

In the capacitive angle detector described in Japanese Unexamined Patent Application Publication No. 10-232104, the capacitor is formed between the electrodes on the first member and the electrodes on the second member, and thus, the size of the capacitive angle detector is large, and the electrodes on the first member and the electrodes on the second member need to be connected by wiring together. Therefore, the structure of the capacitive angle detector is large, and the wiring process is complicated.

These and other drawbacks exist.

SUMMARY OF THE DISCLOSURE

The present disclosure provides a rotary input apparatus that can be formed so as to be thin.

A rotary input apparatus according to an exemplary embodiment includes one stationary facing surface, a rotary facing portion facing the stationary facing surface, and an operation portion configured to rotate the rotary facing portion. A stationary electrode having a plurality of facing portions is provided on the stationary facing surface, the plurality of facing portions being arranged at a certain pitch in a circumferential direction of a circle, the circle being concentric with the center of rotation of the rotary facing portion. The rotary facing portion is arranged above the stationary facing surface. A rotary electrode is provided on the bottom surface of the rotary facing portion, the rotary electrode facing the stationary electrode and being capable of being capacitively coupled with the plurality of facing portions.

In the rotary input apparatus according to an exemplary embodiment, the stationary electrode may include a first stationary sensing electrode and a second stationary sensing electrode formed along circumferences of different circles, the circles being concentric with the center of rotation of the rotary facing portion. The first stationary sensing electrode may include a plurality of first facing portions and a first conducting portion, the plurality of first facing portions being arranged at a certain pitch along the circumference of one of the different circles and being the plurality of facing portions, the first conducting portion electrically connecting the plurality of first facing portions to one another. The second stationary sensing electrode may include a plurality of second facing portions and a second conducting portion, the plurality of second facing portions being arranged at a certain pitch along the circumference of the other one of the different circles and being the plurality of facing portions, the second conducting portion electrically connecting the plurality of second facing portions to one another. The plurality of first facing portions and the plurality of second facing portions may be formed by dividing rings, each of the rings being formed along the circumference of the one or the other one of the different circles, at an equal angular pitch in the circumferential direction so that the plurality of first facing portions and the plurality of second facing portions each may have a predetermined angular width in the circumferential direction, and the plurality of first facing portions and the plurality of second facing portions may have different phases from each other in the circumferential directions of the circles.

In a rotary input apparatus according to an exemplary embodiment, the stationary electrode may include a stationary ground electrode disposed between the first stationary sensing electrode and the second stationary sensing electrode, the stationary ground electrode having a ring shape and being concentric with the center of rotation of the rotary facing portion.

In a rotary input apparatus according to an exemplary embodiment, the rotary electrode may be formed so as to simultaneously face one of the plurality of first facing portions and one of the plurality of second facing portions, and the rotary electrode may be formed so as not to simultaneously face adjacent first facing portions of the plurality of first facing portions and so as not to simultaneously face adjacent second facing portions of the plurality of second facing portions.

In a rotary input apparatus according to an exemplary embodiment, the rotary electrode and the operation portion may be electrically connected to each other, and the rotary electrode may be set to have the ground potential by operating the operation portion with a finger of a user.

In a rotary input apparatus according to an exemplary embodiment, the stationary electrode may include a plurality of third stationary sensing electrodes, the plurality of third stationary sensing electrodes being the plurality of facing portions. The plurality of third stationary sensing electrodes may be formed by dividing a ring, the ring being concentric with the center of rotation of the rotary facing portion, at an equal angular pitch in the circumferential direction so that the plurality of third stationary sensing electrodes each have a predetermined angular width in the circumferential direction. Rotation angles may be detected on the basis of individual input signals each obtained from one of the plurality of third stationary sensing electrodes in accordance with variation in a capacitance associated with rotation of the rotary facing portion.

The rotary input apparatus according to various embodiments has a structure in which a rotary electrode that is provided on one rotary facing portion faces a plurality of facing portions of a stationary electrode that is provided on one stationary facing surface, and thus, the rotary input apparatus can be formed so as to be thin.

BRIEF DESCRIPTION OF THE DRAWINGS

FIG. 8 is a plan view illustrating a structure of a stationary electrode on a stationary facing surface that is provided in a rotary input apparatus according to an exemplary embodiment of the disclosure.

DETAILED DESCRIPTION OF THE DISCLOSURE

The following description is intended to convey a thorough understanding of the embodiments described by providing a number of specific embodiments and details involving a rotary input apparatus. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Figure 1:
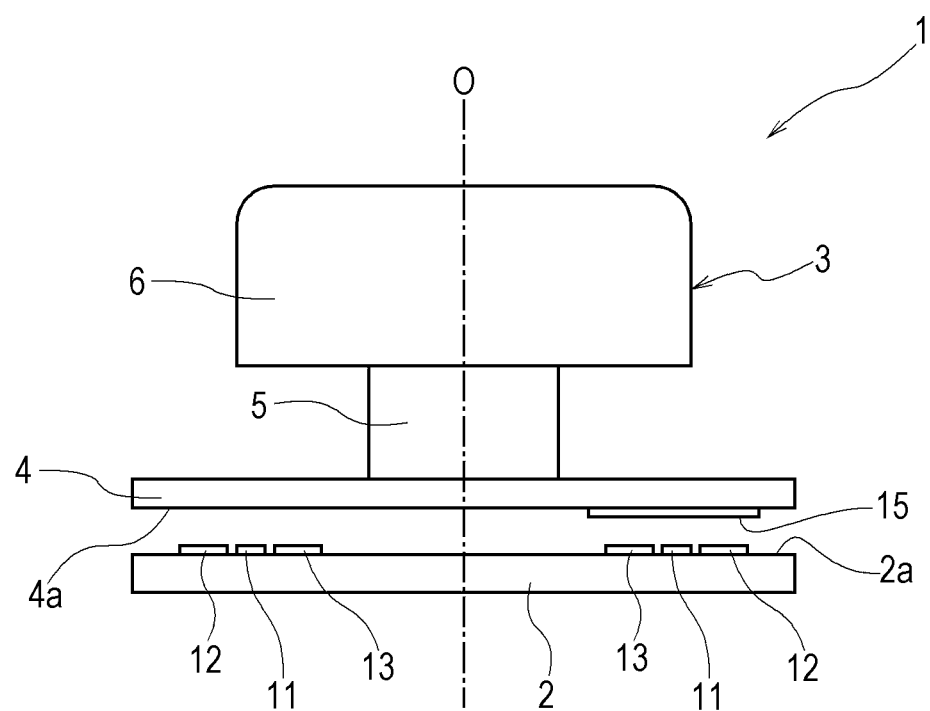
FIG. 1 is a side view illustrating a rotary input apparatus according to an embodiment of the disclosure.

A rotary input apparatus 1 according to an exemplary embodiment of the present disclosure illustrated in FIG. 1 is used as a rotary encoder.

The rotary input apparatus 1 may include a stationary plate 2 and a rotary portion 3. The rotary portion 3 may include a rotary plate 4, a shaft portion 5, and an operation portion 6. The rotary portion 3 can freely rotate about a rotation center line O while being held by the shaft portion 5, and a mechanism that controls the rotation angle of the rotary portion 3 is not provided. The rotary plate 4 may be a circular plate that may be arranged above the stationary plate 2 and may have the rotation center line O as its center. The bottom surface of the rotary plate 4 may be a rotary facing portion 4a. The stationary plate 2 may be a circular plate that has the rotation center line O as its center, and a surface of the stationary plate 2 that faces the rotary facing portion 4a may be a stationary facing surface 2a. The rotary facing portion 4a and the stationary facing surface 2a may face each other at a small distance.

In the rotary input apparatus 1 according to the such an embodiment, at least one of the stationary plate 2 and the rotary plate 4 may be covered with an insulating material or may be formed as a plate made of an insulating material. The shaft portion 5 and the operation portion 6 may be made of an insulating material, for example.

Figure 2:
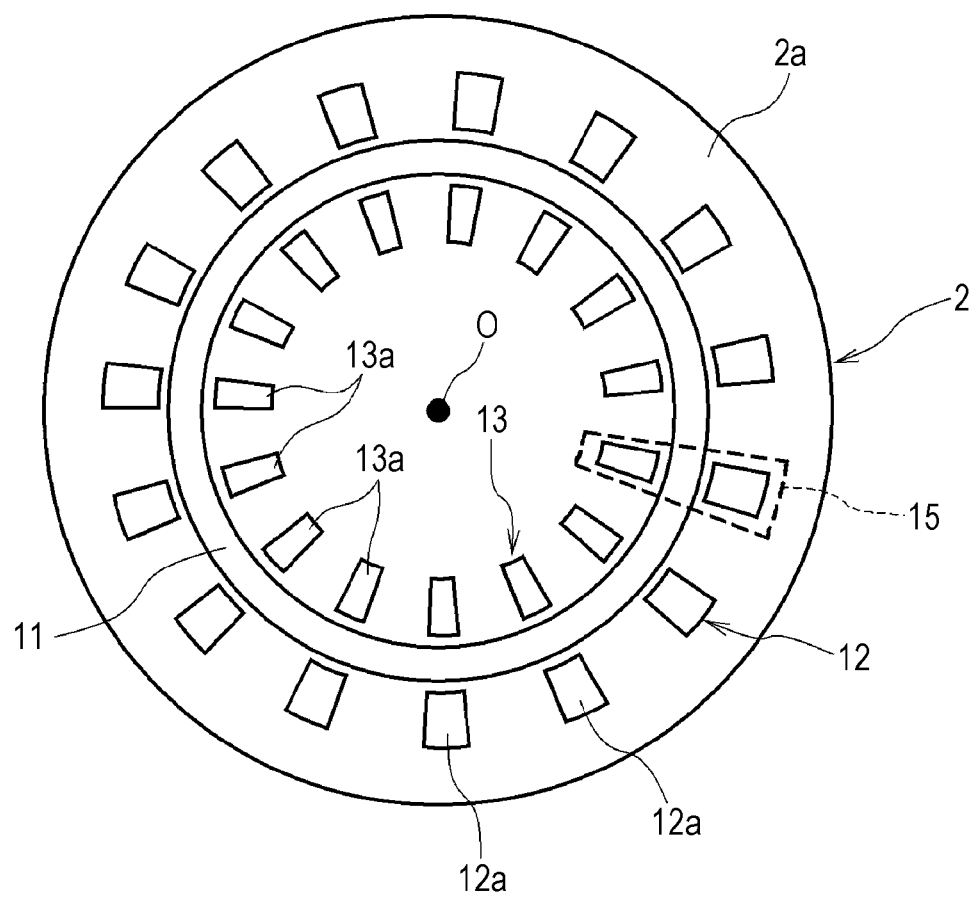
FIG. 2 is a plan view illustrating a structure of a stationary electrode on a stationary facing surface that is provided in the rotary input apparatus according to an exemplary embodiment.
Figure 3:
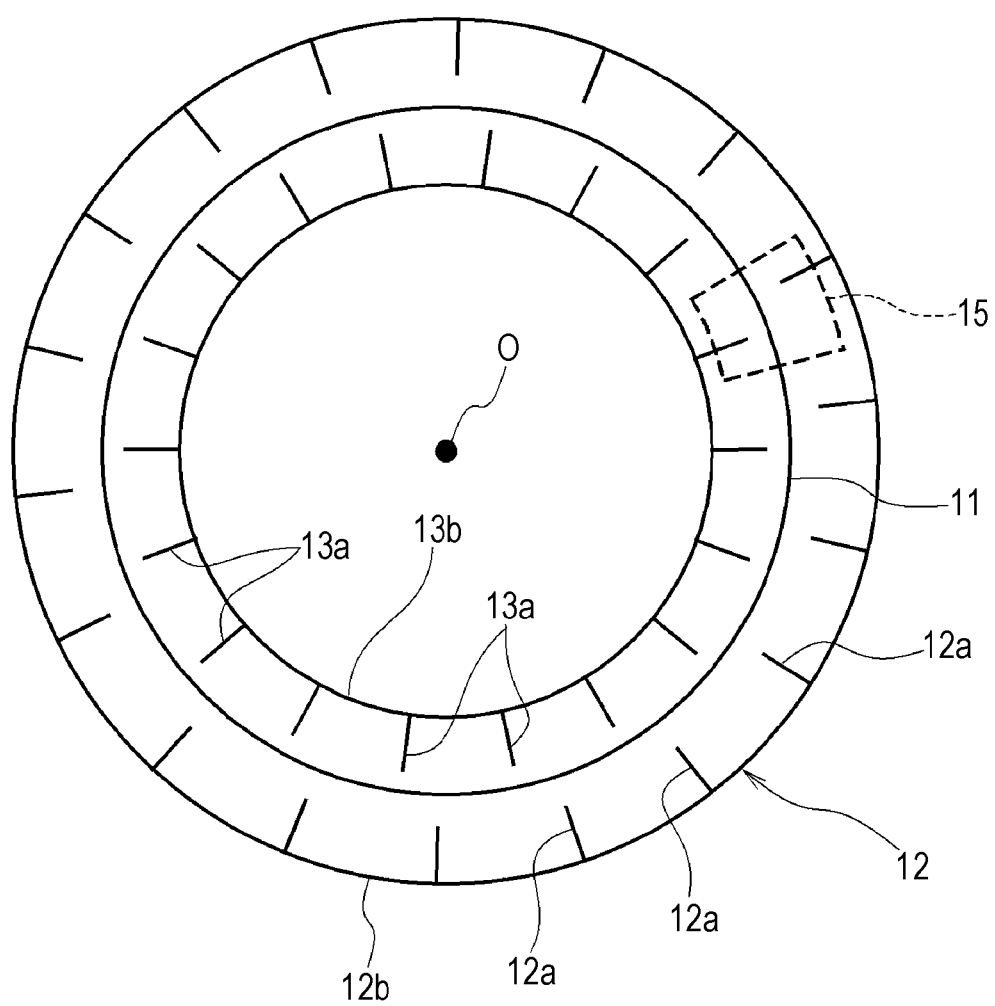
FIG. 3 is an explanatory diagram illustrating the stationary electrode illustrated in FIG. 2 in a simplified manner.

As illustrated in FIG. 2 and FIG. 3, which is an explanatory diagram illustrating the electrode pattern of FIG. 2 in a simplified manner, a stationary ground electrode 11, a first stationary sensing electrode 12, and a second stationary sensing electrode 13 may be provided on the stationary facing surface 2a of the stationary plate 2. The stationary ground electrode 11 may be formed in a ring-shaped pattern that continuously extends through 360 degrees around the rotation center line O. The first stationary sensing electrode 12 and the second stationary sensing electrode 13 may be arranged along circumferences of circles that also have the rotation center line O as their centers like the stationary ground electrode 11. In this case, the first stationary sensing electrode 12 and the second stationary sensing electrode 13 may be arranged along different circumferences. The first stationary sensing electrode 12 may include a plurality of first facing portions 12a (facing portions) and a first connecting portion 12b that may connect the first facing portions 12a to one another. The second stationary sensing electrode 13 may include a plurality of second facing portions 13a (facing portions) and a second connecting portion 13b that may connect the second facing portions 13a to one another.

As illustrated in FIG. 2, all of the first facing portions 12a may be arranged at an equal distance from the stationary ground electrode 11, and all of the first facing portions 12a may be arranged along the entire circumference of a circle at a certain pitch. All of the second facing portions 13a may be arranged at an equal distance from the stationary ground electrode 11, and all of the second facing portions 13a may be arranged along the circumference of a different circle from the circle on which all of the first facing portions 12a are arranged, and may be arranged along the entire circumference of the different circle at a certain pitch.

In various embodiments, equal numbers of the first facing portions 12a and the second facing portions 13a may be provided. However, the first facing portions 12a and the second facing portions 13a may have different phases from each other in the circumferential direction.

The stationary ground electrode 11, the first stationary sensing electrode 12, and the second stationary sensing electrode 13 may be formed by embedding electrically conductive plates each having a surface coated with a low resistance material such as gold in a surface of the stationary plate 2 and by exposing the stationary ground electrode 11, which may have a ring shape, the first facing portions 12a, and the second facing portions 13a at the stationary facing surface 2a. Although the first connecting portion 12b and the second connecting portion 13b may be embedded in the stationary plate 2 so as not to be exposed at the stationary facing surface 2a, a structure in which the first connecting portion 12b and the second connecting portion 13b are exposed at the stationary facing surface 2a may be employed.

The stationary ground electrode 11, the first stationary sensing electrode 12, and the second stationary sensing electrode 13 may be formed of an electrically conductive thin film, an electrically conductive sputtered film, or the like that is formed on the stationary facing surface 2a.

As illustrated in FIGS. 2 and 3, a rotary electrode 15 may be formed so as to simultaneously face the stationary ground electrode 11, one of the first facing portions 12a, and one of the second facing portions 13a, and the rotary electrode 15 may be formed so as not to simultaneously face two adjacent first facing portions 12a and so as not to simultaneously face two adjacent second facing portions 13a. Although the rotary electrode 15 may not face the first connecting portion 12b and the second connecting portion 13b, there will be no problem with respect to the principle of operation of the rotary input apparatus 1 even if the rotary electrode 15 faces the first connecting portion 12b and the second connecting portion 13b.

The rotary electrode 15 may be formed on the rotary facing portion 4a through a process the same as that of forming the stationary ground electrode 11, the first stationary sensing electrode 12, and the second stationary sensing electrode 13.

Figure 4:
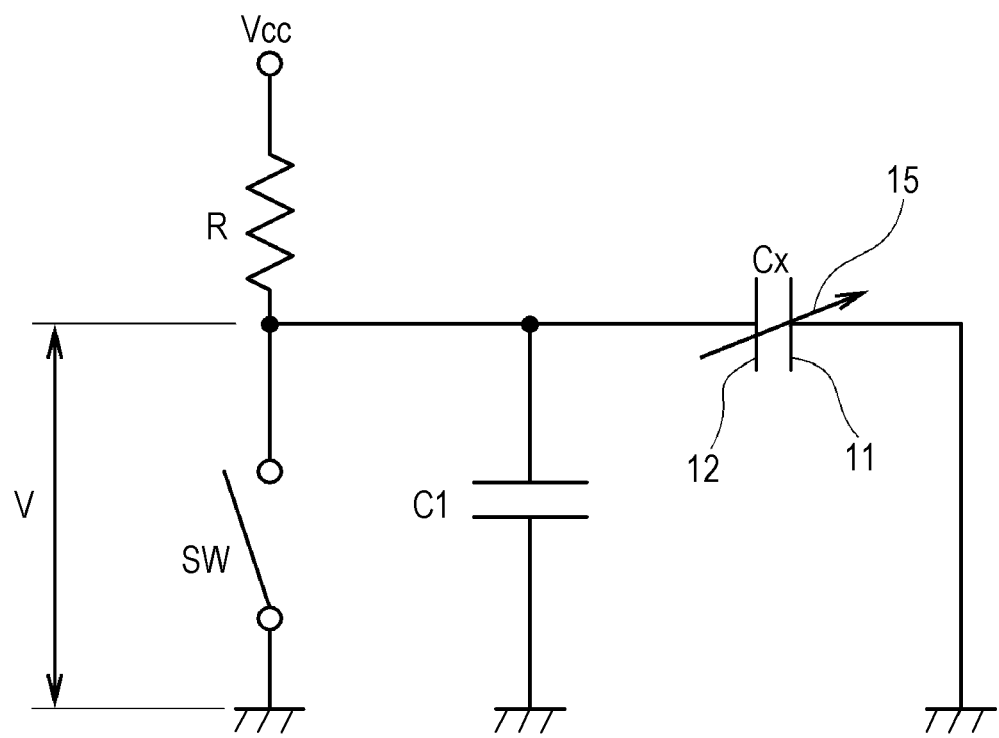
FIG. 4 is a circuit diagram illustrating an operation of the rotary input apparatus.

A circuit configuration of the rotary input apparatus 1 when the rotary input apparatus 1 performs sensing operation is illustrated in FIG. 4 in a simplified manner.

As illustrated in FIG. 4, the first stationary sensing electrode 12 and the stationary ground electrode 11 may be coupled with each other so as to have a coupling capacitance Cx therebetween. The coupling capacitance Cx may vary with a rotation position of the rotary electrode 15. A facing area over which the rotary electrode 15 and the stationary ground electrode 11 face each other may not vary with a position of the rotary electrode 15. However, when the whole surface of the rotary electrode 15 and the whole surface of one of the first facing portions 12a face each other, the coupling capacitance Cx between the stationary ground electrode 11 and the first stationary sensing electrode 12 may be maximized, and when the rotary electrode 15 deviates from the first facing portion 12a, the coupling capacitance Cx between the stationary ground electrode 11 and the first stationary sensing electrode 12 may be minimized.

Figure 5A:
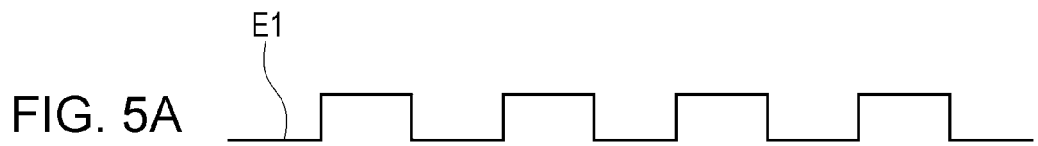
FIGS. 5A and 5B are waveform diagrams of encoded signals that can be obtained from the rotary input apparatus according to an embodiment of the disclosure.

When the coupling capacitance Cx increases, the sum of the coupling capacitance Cx and the capacitance of a capacitor C1 increases, and a voltage V that is generated across the coupling capacitance Cx and the capacitor C1 may increase. A sensed output can be obtained by repeatedly connecting and disconnecting a switch SW in a short period of time and by calculating the voltage V that is measured while the switch SW is connected. The sensed output may be high while the rotary electrode 15 is facing one of the first facing portions 12a and may be low while the rotary electrode 15 is deviating from the first facing portion 12a. An encoded signal E1 of a first phase illustrated in FIG. 5A can be obtained by shaping a waveform of the sensed output.

Figure 5B:
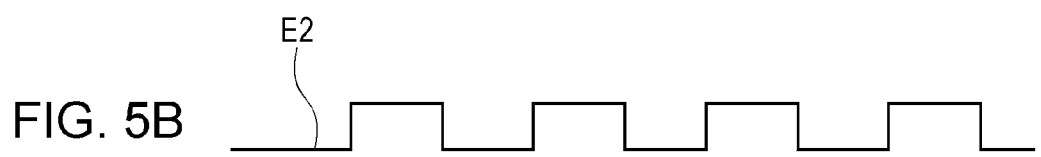

An encoded signal E2 of a second phase illustrated in FIG. 5B can be obtained by obtaining a sensed output in the same way as described above in another circuit configuration that is obtained by replacing the first stationary sensing electrode 12 with the second stationary sensing electrode 13 in the circuit configuration illustrated in FIG. 4. In other words, two encoded signals E1 and E2 of the first and second phases, the number of pulses of each of the signals varying in accordance with a rotation angle of the rotary portion 3, can be obtained by providing two of the detection circuits illustrated in FIG. 4. The pulse period of each of the encoded signals E1 and E2 may vary in accordance with a rotational angular velocity of the rotary portion 3. Since the encoded signal E1 of the first phase and the encoded signal E2 of the second phase have different phases from each other, the direction of rotation of the rotary portion 3 can be detected.

In order to obtain the encoded signal E1 of the first phase and the encoded signal E2 of the second phase as signals having the same level in the above-described circuit, the area of each of the first facing portions 12a may be the same as the area of each of the second facing portions 13a, and a facing area over which one of the first facing portions 12a and that the rotary electrode 15 face each other and a facing area over which one of the second facing portions 13a and the rotary electrode 15 face each other be the same. However, the first facing portions 12a and the second facing portions 13a can have any shape as long as the coupling capacitances Cx between the stationary ground electrode 11 and the first facing portions 12a and the coupling capacitances Cx between the stationary ground electrode 11 and the second facing portions 13a may be the same.

In the rotary input apparatus 1 illustrated in FIGS. 1 and 2, the rotary electrode 15 may be provided on the one rotary facing portion 4a, and the stationary ground electrode 11, the first stationary sensing electrode 12, and the second stationary sensing electrode 13 may be provided on the one stationary facing surface 2a, thereby having a structure in which the one rotary facing portion 4a and the one stationary facing surface 2a face each other. Thus, the rotary input apparatus 1 can be formed so as to be thin. Since the rotary electrode 15 on the rotary facing portion 4a is not directly connected to an external circuit, the rotary portion 3 need not be connected by wiring. The encoded signal E1 of the first phase and the encoded signal E2 of the second phase that correspond to rotation angles and rotation directions of the rotary portion 3 that are not controlled because nothing comes into contact with the rotary portion 3 can be obtained.

Figure 6:
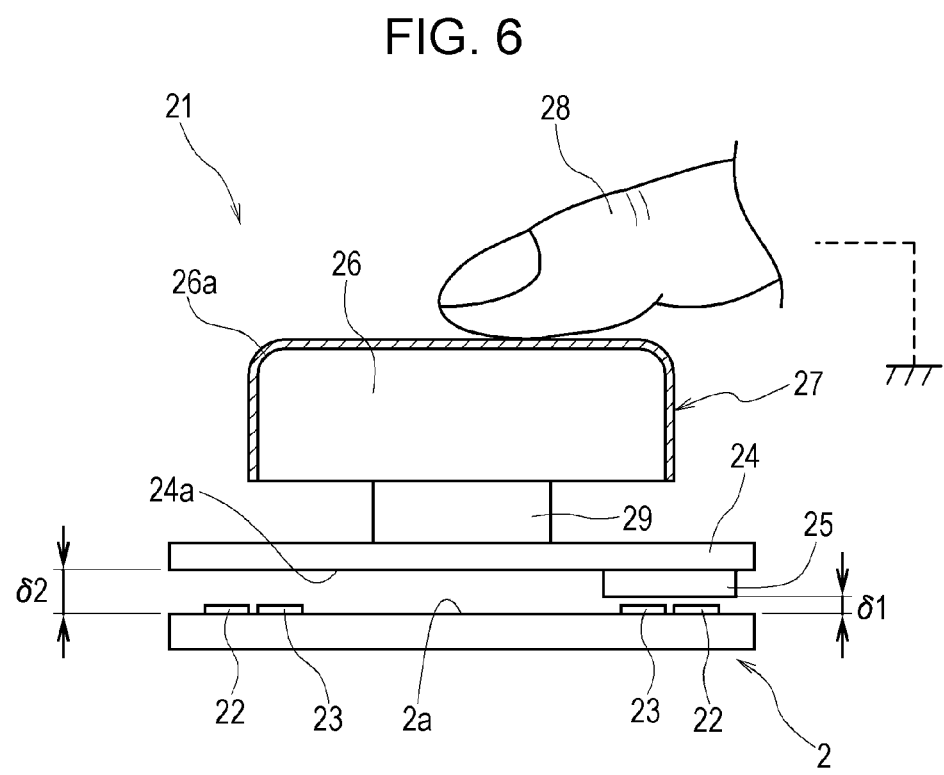
FIG. 6 is a side view illustrating a rotary input apparatus according to an embodiment of the disclosure.
Figure 7:
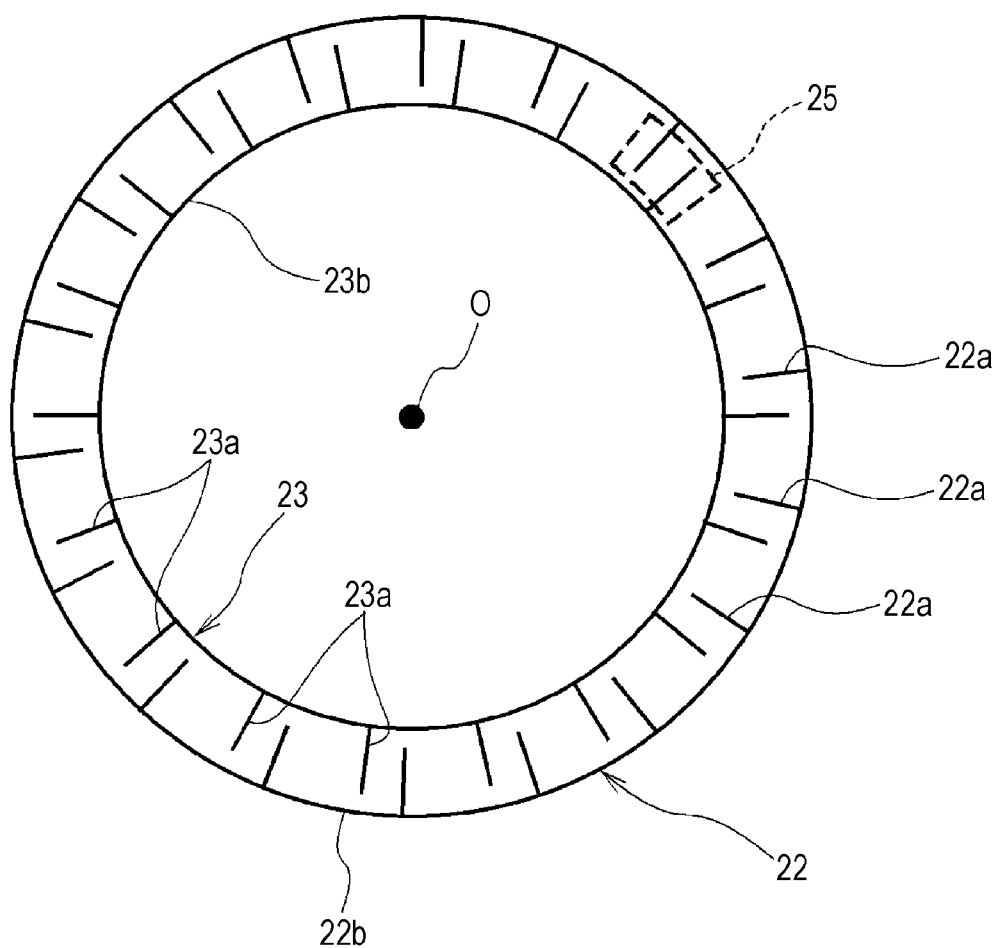
FIG. 7 is an explanatory diagram illustrating, in a simplified manner, a stationary electrode on a stationary facing surface that is provided in the rotary input apparatus according to an exemplary embodiment of the disclosure.

FIGS. 6 and 7 illustrate a rotary input apparatus 21 according to an exemplary embodiment of the present disclosure.

A stationary plate 2 of this rotary input apparatus 21 is an insulating plate, and a stationary facing surface 2a of the stationary plate 2 may be provided with a first stationary sensing electrode 22 and a second stationary sensing electrode 23. The first stationary sensing electrode 22 may include a plurality of first facing portions 22a (facing portions) and a first connecting portion 22b that may electrically connect the first facing portions 22a to one another. The second stationary sensing electrode 23 may include a plurality of second facing portions 23a (facing portions) and a second connecting portion 23b that may electrically connect the second facing portions 23a to one another.

Although the first facing portions 22a and the second facing portions 23a are illustrated by thin lines in FIG. 7, in practice, they each may have a predetermined area as with the first facing portions 12a and the second facing portions 13a illustrated in FIG. 2. The area of each of the first facing portions 22a may be the same as the area of each of the second facing portions 23a.

An angle at which adjacent first facing portions 22a are disposed with respect to the rotation center line O and an angle at which adjacent second facing portions 23a are disposed with respect to the rotation center line O may be the same, and equal numbers of the first facing portions 22a and the second facing portions 23a may be provided. However, the first facing portions 22a and the second facing portions 23a may have different phases from each other in the circumferential direction.

A rotary portion 27 illustrated in FIG. 6 may include a rotary plate 24, a shaft portion 29, and an operation portion 26, and a rotary electrode 25 may be provided on a rotary facing portion 24a of the rotary plate 24. The rotary electrode 25 may be formed so as to simultaneously face one of the first facing portions 22a and one of the second facing portions 23a, and the rotary electrode 25 may be formed so as not to simultaneously face two adjacent first facing portions 22a and so as not to simultaneously face two adjacent second facing portions 23a.

In the rotary portion 27, at least the operation portion 26 may be electrically conductive and may be electrically connected to the rotary electrode 25 that is an electric conductor. In the embodiment illustrated in FIG. 6, the rotary plate 24, the shaft portion 29, and the operation portion 26 may be made of a conductive material, and for example, are made of a conductive resin. Therefore, the rotary plate 24 and the rotary electrode 25 can be integrally formed. However, a space δ2 between each of the first facing portions 22a and the corresponding one of the second facing portions 23a and the rotary facing portion 24a of the rotary plate 24 may be larger than a space δ1 between each of the first facing portions 22a and the corresponding one of the second facing portions 23a and the rotary electrode 25. The space δ2 may not be less than twice the space δ1.

As illustrated in FIG. 6, a surface of the operation portion 26, which is electrically conductive, may be covered with a thin insulating layer 26a.

When the operation portion 26 is held and operated by a finger 28 of a user that is electrically conductive and that has a potential close to the ground potential, the potential of the rotary electrode 25 will be substantially the same as the ground potential. Therefore, when the rotary electrode 25 rotates around the rotation center line O, an encoded signal E1 of the first phase that is the same as that illustrated in FIG. 5A may be obtained between the rotary electrode 25 and the first stationary sensing electrode 22, and an encoded signal E2 of the second phase that is the same as that illustrated in FIG. 5B is obtained between the rotary electrode 25 and the second stationary sensing electrode 23.

FIG. 8 illustrates an electrode pattern formed on a stationary facing surface 2a of a rotary input apparatus 31 according to an exemplary embodiment of the present disclosure.

In this rotary input apparatus 31, a stationary ground electrode 42 that is continuously formed in a ring shape having a certain radius from the rotation center line O and a third stationary sensing electrode 43 may be formed. The third stationary sensing electrode 43 may be divided into a plurality of third facing portions 43a to 43i (facing portions), and the third facing portions 43a to 43i may not be electrically connected to one another and may be independent of one another. Each of the third facing portions 43a to 43i may form the circuit illustrated in FIG. 4 together with the stationary ground electrode 42. In other words, the rotary input apparatus 31 has as many detection circuits illustrated in FIG. 4 as the number of the third facing portions 43a to 43i.

A rotary portion that faces the stationary facing surface 2a illustrated in FIG. 8 may be the same as the rotary portion 3 illustrated in FIG. 1, and a rotary electrode 45 is provided on a rotary facing portion 4a of a rotary plate 4. As illustrated in FIG. 8, the rotary electrode 45 faces both the stationary ground electrode 42 and each of the third facing portions 43a to 43i at a small distance.

In the rotary input apparatus 31 illustrated in FIG. 8, when the rotary portion rotates, the rotary electrode 45 may sequentially face each of the third facing portions 43a to 43i while constantly facing the stationary ground electrode 42. When the rotary electrode 45 faces any one of the third facing portions, the output voltage varies. A detection signal for determining an absolute angle that shows how far the rotary portion has rotated can be obtained by detecting how the output voltage varies.

Various embodiments have been described above, and the rotary electrode and the stationary electrode face each other at a small distance in all the embodiments. However, the rotary electrode and the stationary electrode may be coated with an insulating material and may slide over each other while being in contact with each other.

Although the rotary plate and the stationary plate are circular plates in the various embodiments, they may have any shape as long as the individual electrodes are circularly arranged.

When the rotary input apparatus according to any one of the embodiments is used as a rotary input apparatus, a mechanism that provides tactile feedback when rotary input is performed may be separately provided.

Accordingly, the embodiments of the present inventions are not to be limited in scope by the specific embodiments described herein. Further, although some of the embodiments of the present disclosure have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:
1. A rotary input apparatus comprising:
a stationary facing surface;
a rotary facing portion facing the stationary facing surface; and
an operation portion configured to rotate the rotary facing portion;
wherein a stationary electrode having a plurality of facing portions is provided on the stationary facing surface,
wherein the rotary facing portion is arranged above the stationary facing surface, the plurality of facing portions being arranged at a certain pitch in a circumferential direction of a circle, the circle being concentric with the center of rotation of the rotary facing portion,
wherein a rotary electrode is provided on a bottom surface of the rotary facing portion, the rotary electrode facing the stationary electrode and being capable of being capacitively coupled with the plurality of facing portions,
wherein the stationary electrode includes a first stationary sensing electrode and a second stationary sensing electrode formed along circumferences of different circles, the circles being concentric with the center of rotation of the rotary facing portion,
wherein the first stationary sensing electrode includes a plurality of first facing portions and a first conducting portion, the plurality of first facing portions being arranged at a certain pitch along the circumference of one of the different circles and being the plurality of facing portions, the first conducting portion electrically connecting the plurality of first facing portions to one another,
wherein the second stationary sensing electrode includes a plurality of second facing portions and a second conducting portion, the plurality of second facing portions being arranged at a certain pitch along the circumference of the other one of the different circles and being the plurality of facing portions, the second conducting portion electrically connecting the plurality of second facing portions to one another, and
wherein the plurality of first facing portions and the plurality of second facing portions are formed by dividing rings, each of the rings being formed along the circumference of the one or the other one of the different circles, at an equal angular pitch in the circumferential direction so that the plurality of first facing portions and the plurality of second facing portions each have a predetermined angular width in the circumferential direction, and the plurality of first facing portions and the plurality of second facing portions have different phases from each other in the circumferential directions of the circles, and
wherein the rotary electrode is formed so as to simultaneously face one of the plurality of first facing portions and one of the plurality of second facing portions, and the rotary electrode is formed so as not to simultaneously face adjacent first facing portions of the plural- ity of first facing portions and so as not to simultaneously face adjacent second facing portions of the plurality of second facing portions.

2. The rotary input apparatus according to claim 1, wherein the stationary electrode includes a stationary ground electrode disposed between the first stationary sensing electrode and the second stationary sensing electrode, the stationary ground electrode having a ring shape and being concentric with the center of rotation of the rotary facing portion.

3. The rotary input apparatus according to claim 2, wherein the rotary electrode and the operation portion are electrically connected to each other, and the rotary electrode is set to have the ground potential by operating the operation portion with a finger of a user.

* * * * *